A. ROSCOE.
DOUGH CUTTING MACHINE.
APPLICATION FILED APR. 30, 1921.
1,434,409.
Patented Nov. 7, 1922.
2 SHEETS—SHEET 1.
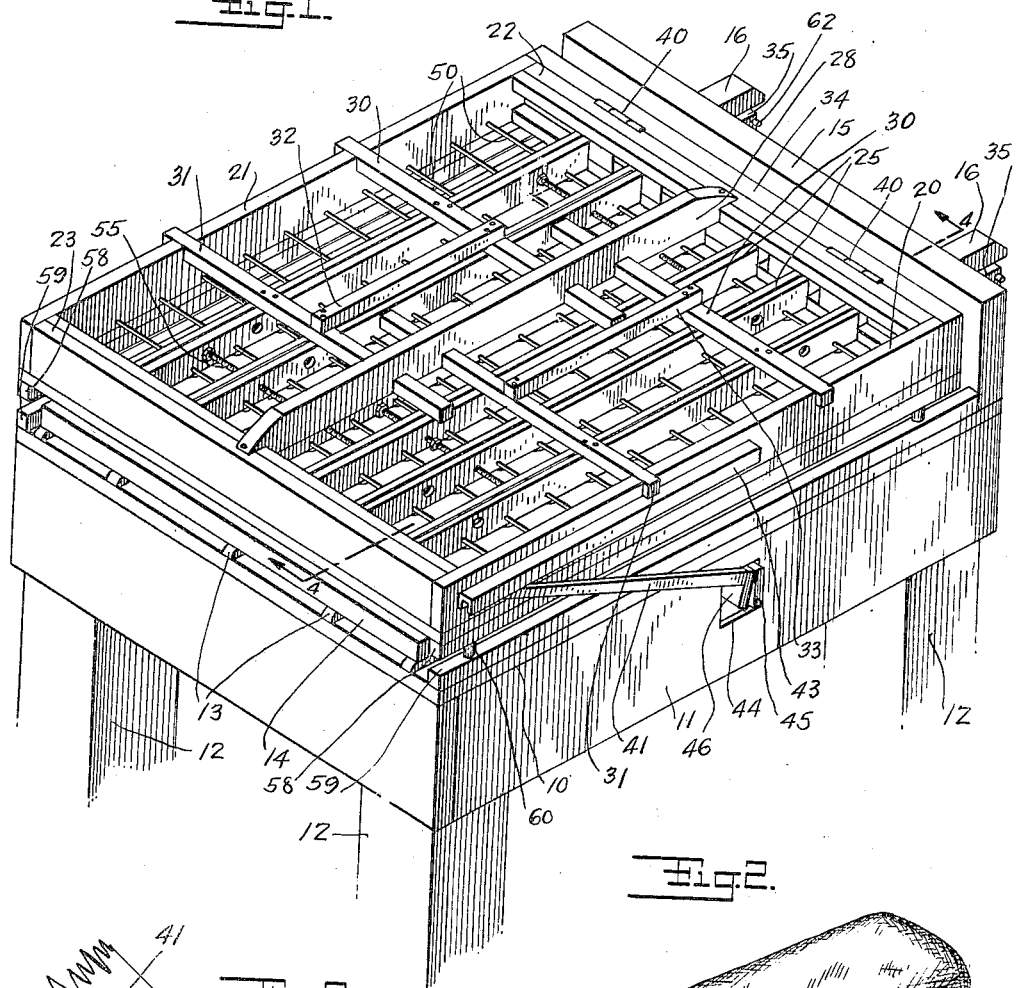
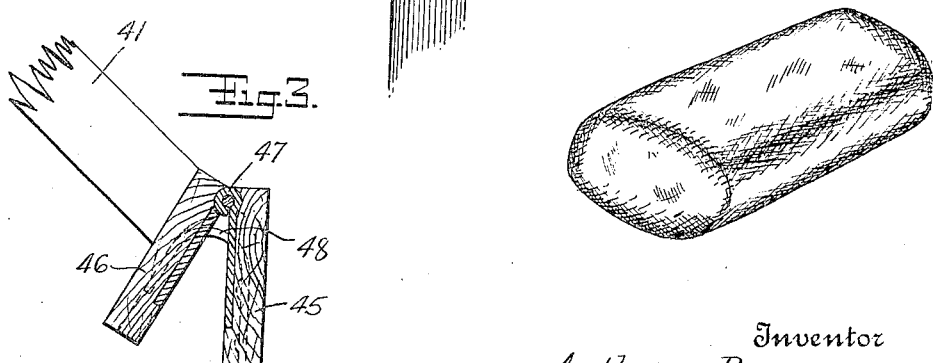
Inventor
Anthony Roscoe
By his Attorney
Eugene Pearl

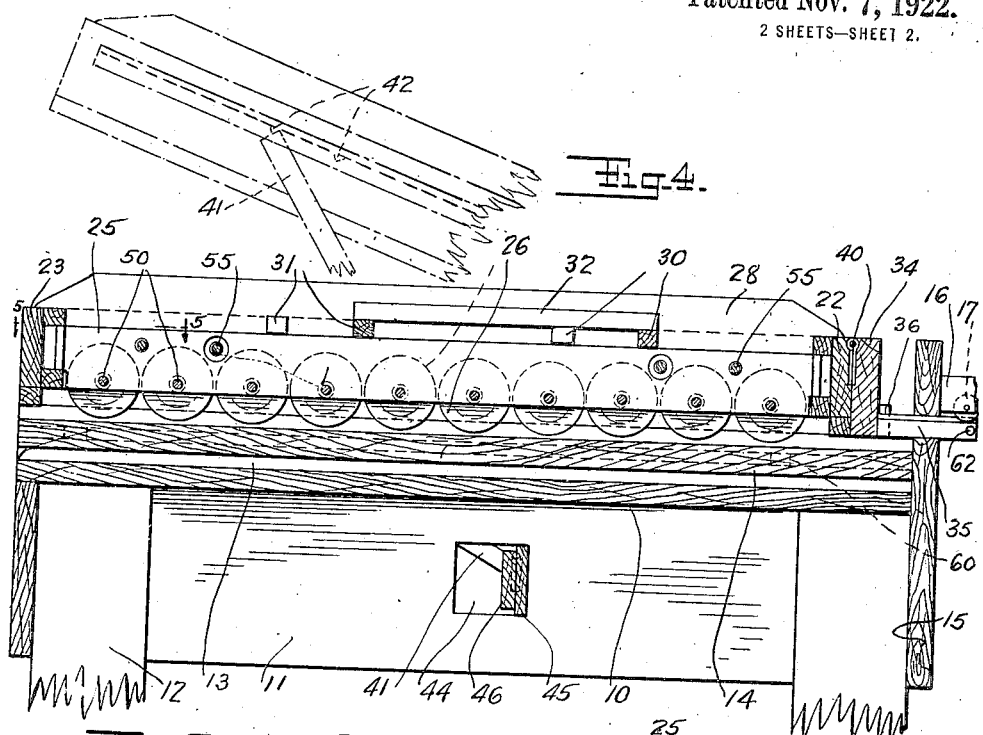
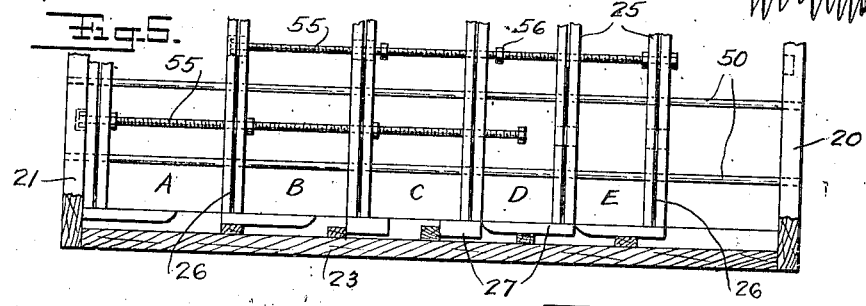
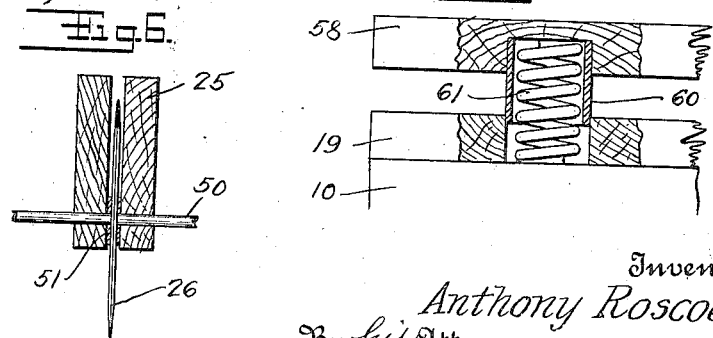

Patented Nov. 7, 1922.

1,434,409

UNITED STATES PATENT OFFICE.

ANTHONY ROSCOE, OF BROOKLYN, NEW YORK.

DOUGH-CUTTING MACHINE.

Application filed April 30, 1921. Serial No. 465,745.

*To all whom it may concern:*

Be it known that I, ANTHONY ROSCOE, a citizen of the United States, and a resident of Brooklyn, county of Kings, and State of New York, have invented certain new and useful Improvements in Dough-Cutting Machines, of which the following is a specification.

The principal object of this invention is to provide a machine of extremely simple construction and capable of performing in an efficient manner the division of dough masses into predetermined sizes.

Another object is the provision made for interchanging the mould or cutting boards.

A third object is the means by which the divided dough is separated one piece from another upon the cutting board.

A final object is the provision in design whereby the elements of cleanliness and sanitation have been given due regard.

These and other objects are attained in the manner set forth in the following description and drawings forming a material part of the specification, and in which:—

Figure 1 is a perspective view of the machine in closed or operating position.

Figure 2 is a perspective view of a dough mass as cut by the machine.

Figure 3 is an enlarged partial sectional view of the cutter carrying frame support.

Figure 4 is a longitudinal sectional view taken on the line 4—4 of Figure 1 showing the cutter carrying frame in open and closed position.

Figure 5 is a partial sectional top plan view taken on line 5—5 of Figure 4.

Figure 6 is an enlarged vertical sectional view of the cutting elements.

Figure 7 is an enlarged sectional view of the spring cushion bar elements.

Referring to the drawings in detail the numeral 10 designates a table top secured to the frame elements 11 and supported by the legs 12, skid bars 13 upon which the interchangeable cutting boards 14 are adapted to slide.

A back board 15 is secured to the rear end of the table and has rearwardly extending elements 16 to which are rotatably mounted the guide wheels 17. A frame unit, adapted to carry dough cutting means, consists primarily of side and end elements 20—21 and 22—23, respectively.

A plurality of transversely positioned bars 25 are disposed in connected pairs and adapted to retain between their adjacent inner faces the rotatably mounted circular knives 26; stops 27 rigidly connected to the ends of each pair of bars determine the longitudinal spacing of the bars.

A transverse, centrally positioned operating bar or handle 28 is secured at its ends to the frame elements 22 and 23 and formed in its lower edge are notches adapted to receive and guide the sliding rectangular cross bars 30 and 31, which are secured to the outside pairs of cutter bars. Similar guide notches are provided upon the upper edges of the side frame elements 20 and 21.

The sliding cross bars 30 and 31 are provided with bar handles 32 and 33 for simultaneously moving the knife bar elements in longitudinal direction.

An upright element 34 extending across the machine frame is provided with rearwardly extending slotted guides 35 passing slidably through aligned openings provided in the back board 15 and engaging with the guide wheels 17 and attached to element 34 by dove-tailed members 36 permitting a slight vertical movement of the cutter frame.

Hinges 40, attached to the frame element 22 and the upright element 34, provide means whereby the front end of the cutter frame unit may be hingedly raised and held in open position by the spring operated arm 41, slidably controlled and automatically engaging the projecting detents 42 provided within the slotted slide 43. Secured to the side frame elements 20 and 21, below the table top 10 and through the table frame elements 11, are rectangular openings 44 to the rear side of which is secured the bar 45 passing entirely through and extending outwardly somewhat beyond the limits of the table width.

Another bar 46 of similar length is connected by hinges 47 to the fixed bar 45, spring means being provided to separate the bar elements 45 and 46, one form 48 being shown in enlarged detail in Figure 3, the extending arms 41 being secured in substantial manner to the cross bar 46.

A plurality of metal shafts 50 pass longitudinally through the hinged frame and are held secure against end movement by the side frame elements 20 and 21, while the transverse pairs of cutter bars 25 are provided with annular holes of sufficient diameter to permit free movement along the shafts 50 which pass through them.

Referring to the enlarged detail in Figure 6, the manner of mounting the circular knives will be seen, it being understood that the knives 26 and supporting collars 51 are free to rotate between the bar elements 25 and also to freely rotate and slide along the shafts 50.

A plurality of metal rods 55, threaded throughout their length, pass slidably through annular openings provided in the cutter bars 25.

Screw threaded nuts 56 adapted to engage the threaded rods are interposed between the cutter bars forming stops.

Certain pairs of cutter bars are provided with annular holes of sufficient size to allow these nuts to freely pass through, the reason for this provision becoming apparent as this disclosure proceeds.

To guard against damage to the knives or the cutting boards transverse bars 58 and 59 are provided, the lower members 59 being secured to the table top 10, and the upper members 58 flexibly connected to the lower element 59 by the tubular bushings 60 and the springs 61 as shown in the enlarged detail Figure 7; by these means, separation between the knives and board may be effected, and a slight additional downward pressure on the operating bar 28 compresses the springs 61 and allows the knives to come into engagement with the cutting board.

In operation, the hinged frame, on being raised, is held in open position by the spring actuated arms 41 engaging detents within the slides 43.

A cutting or pastry board as 14, having previously been supplied with rolls of dough of definite sectional area and of slightly less length than the width of cutting board, is positioned longitudinally with respect to the machine, the filled board is then placed upon the bars 13 and pushed forward until stopped by striking the back board 15; the arms 41, on being released permit the frame to be lowered onto the spring bars 58; by grasping the center bar or handle 28 and applying slight pressure, the frame is forced downward, carrying the knives into contact with the board 14, and while in this position the frame is drawn forward, the cutter knives separating the dough rolls into equal predetermined lengths; stops 62 are provided for limiting the forward movement of the frame.

That the severed pieces of dough may not stick together provision is made for their separation in the following manner. After the dough has been cut as described, pressure being released from the center bar, allows the frame to rise slightly above the board.

The bar handles 32 and 33, secured to the slide bars 30 and 31, which in turn are attached to the outer pairs of cutter bars 25, are each moved outwardly from the normal positions, this movement separating the cut pieces and forcing from the board all waste ends.

Referring to Figure 5, the sections indicated as A—B—C represent the cutter bars in outward or separating position and the sections D—E represent the inward or cutting position.

Having thus described my invention, what I claim as new and desire to secure by Letters Patent, is:—

1. A dough cutting apparatus comprising a platform, a moulding board removably engaged thereon, horizontal slides at the rear of said platform, a frame hinged to said slides and a plurality of circular knives mounted in said frame, to operate as a unit.

2. A dough cutting apparatus comprising a platform, horizontal slides at the rear thereof, a frame hinged to said slides, a plurality of disc cutters revolubly mounted in fixed horizontal rows in said frame, means for manually actuating said frame, and a dough supporting board removably engaged on said platform below said frame.

3. A dough cutting apparatus comprising a platform, horizontal slides at the rear thereof, sliding elements carried by said horizontal slide, a frame hinged to said sliding elements, a series of rows of spaced circular knives in said frame, means for normally raising said frame in a plane parallel to said platform, and means for depressing and actuating said frame and knives.

4. A dough cutting apparatus comprising a platform, a frame hinged at the rear thereof, disc cutters disposed in spaced relation in rows in said frame on fixed axis, means for reciprocatively moving said frame and cutters, means for holding them in a normally raised position, means for normally raising said frame on its hinges and means for holding said frame when so raised.

5. A dough cutting apparatus comprising a platform, a frame hinged at the rear thereof, said frame being reciprocatively movable, means for actuating said frame, a plurality of spaced vertical cutters revoluble in said frame, and means for spreading said cutters laterally.

6. A dough cutting apparatus comprising a platform, a frame hinged at the rear thereof, disc cutters disposed in spaced relation in rows in said frame, means for shifting said cutters laterally to increase the center distance therebetween, means for returning said cutters to their initial position, and means for actuating said frame and cutters longitudinally of said platform.

7. A dough cutting apparatus comprising a platform, a movable frame engaged therewith, a plurality of rows of cutters revoluble in said frame, means for spreading said cutters apart simultaneously so as to increase the distance between any adjacent pairs, means for returning said cutters to their initial position, and means for the manual operation of said frame.

8. A dough cutting apparatus comprising a platform, a frame engaged therewith, said frame being movable, a plurality of rows of cutters revoluble in said frame, means for spreading said cutters apart simultaneously so as to increase the distance between any adjacent pairs, means for returning said cutters to their initial position, means normally raising said frame from said platform in a plane parallel thereto, means permitting said frame to swing upward along its rear edge, and means for supporting said frame when so raised.

9. A dough cutting apparatus comprising a platform, strips at the side thereof, means for normally holding said strips in a raised position, longitudinal slides at the rear of said platform, vertically movable elements carried by said slides, a frame hinged to said vertically movable elements, a mould board disposable on said platform between said strips, spring actuated supports for said frame when in a raised position, means for depressing and moving said frame longitudinally, a plurality of rods arranged transversely in said frame, circular cutters mounted in spaced relation on said rods, means for simultaneously increasing the space between said cutters, and means for returning said cutters to their initial position.

In testimony whereof I have signed my name to this specification.

ANTHONY ROSCOE.